US012789942B2

(12) United States Patent
Huang et al.

(10) Patent No.: US 12,789,942 B2
(45) Date of Patent: Nov. 10, 2026

(54) CONTROL SYSTEM AND CONTROL METHOD FOR E-BIKE

(71) Applicant: DELTA ELECTRONICS, INC., Taoyuan City (TW)

(72) Inventors: Sheng-Chi Huang, Taoyuan City (TW); Chun-Lin Chen, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 582 days.

(21) Appl. No.: 18/452,871

(22) Filed: Aug. 21, 2023

(65) Prior Publication Data

US 2024/0400156 A1 Dec. 5, 2024

(30) Foreign Application Priority Data

Jun. 1, 2023 (CN) ......................... 202310639735.8

(51) Int. Cl.
*B62M 6/50* (2010.01)
*B62J 6/028* (2020.01)

(52) U.S. Cl.
CPC ................ *B62M 6/50* (2013.01); *B62J 6/028* (2020.02)

(58) Field of Classification Search
CPC ... B62M 6/50; B62M 6/45; B62J 6/028; B62J 45/411; B62J 45/413
See application file for complete search history.

(56) References Cited

U.S. PATENT DOCUMENTS 6,874,592 B2 * 4/2005 Yokotani ............. B60L 15/2009 180/65.1
10,421,519 B2 * 9/2019 Tsuchizawa ............. B62M 6/45
11,161,565 B2 * 11/2021 Kurotobi ................ B62K 25/30
(Continued)

FOREIGN PATENT DOCUMENTS

CN 201336747 Y 10/2009
CN 103863507 A 6/2014
(Continued)

OTHER PUBLICATIONS

KR-101897758-B1 translation (Year: 2018).*
(Continued)

*Primary Examiner* — Kyle T Johnson
(74) *Attorney, Agent, or Firm* — MUNCY, GEISSLER, OLDS & LOWE, P.C.

(57) ABSTRACT

A control system for e-bike including a sensor and a driver is disclosed. The sensor senses a pedal of the bike being pedaled to generate a sensing signal. The driver continuously identifies whether the sensing signal matches with an unlocking condition during a first time-duration and whether the sensing signal matches with a mode-determination condition during a second time-duration. The driver controls the e-bike to enter a normal operation mode where a motor of the e-bike is unlocked when the sensing signal matches the unlocking condition, controls the e-bike to enter a standby mode when the sensing signal matches the mode-determination condition under the normal operation mode, or controls the e-bike to return to the normal operation mode when the sensing signal matches the mode-determination condition again under the standby mode.

8 Claims, 7 Drawing Sheets

(56) References Cited

U.S. PATENT DOCUMENTS

| | | | | |
|---|---|---|---|---|
| 2005/0140113 | A1* | 6/2005 | Kokatsu | A63B 22/0605 280/205 |
| 2005/0246152 | A1* | 11/2005 | Kokatsu | G06Q 30/0623 703/22 |
| 2011/0214526 | A1* | 9/2011 | Demma | G05G 1/40 74/560 |
| 2012/0083956 | A1* | 4/2012 | Aoki | B62M 6/45 701/22 |
| 2013/0205945 | A1* | 8/2013 | Hosaka | B62M 3/16 74/594.2 |
| 2014/0166385 | A1* | 6/2014 | Arimune | B62J 45/421 180/206.3 |
| 2015/0122565 | A1* | 5/2015 | Deleval | B62M 6/55 180/206.3 |
| 2016/0107719 | A1* | 4/2016 | Hosaka | B60L 15/2018 701/22 |
| 2016/0202710 | A1* | 7/2016 | Hosaka | G05D 17/02 318/452 |
| 2016/0311491 | A1* | 10/2016 | Watarai | B62J 45/20 |
| 2017/0050080 | A1* | 2/2017 | Mizuochi | G16H 20/30 |
| 2018/0072373 | A1* | 3/2018 | Kishita | B62M 6/40 |
| 2019/0031283 | A1* | 1/2019 | Suzuki | B62M 9/122 |
| 2019/0202525 | A1* | 7/2019 | Shahana | B62M 6/50 |
| 2019/0280628 | A1* | 9/2019 | Hosaka | B60T 8/17 |
| 2019/0299797 | A1* | 10/2019 | Hasumi | B60L 50/20 |
| 2022/0388602 | A1* | 12/2022 | Hahn | B62M 9/132 |
| 2023/0136706 | A1* | 5/2023 | Higashi | B62M 6/50 180/206.3 |
| 2024/0400156 | A1* | 12/2024 | Huang | B62J 45/413 |

FOREIGN PATENT DOCUMENTS

| | | | | | |
|---|---|---|---|---|---|
| CN | 106064663 | A | | 11/2016 | |
| CN | 106627971 | A | | 5/2017 | |
| CN | 115432103 | A | | 12/2022 | |
| CN | 121493152 | A | * | 2/2026 | F03G 7/081 |
| JP | 2000168672 | A | * | 6/2000 | B62M 6/50 |
| JP | 2019517414 | A | * | 6/2019 | B62M 6/55 |
| KR | 101897758 | B1 | * | 9/2018 | B62M 6/45 |
| TW | 202033407 | A | | 9/2020 | |

OTHER PUBLICATIONS

JP-2000168672-A translation (Year: 2000).*
An_adaptive_pedaling_assistive_device_for_asymmetric_torque_assitant_in_cycling2023.pdf (Year: 2023).*
JP-2019517414-A translation (Year: 2019).*
CN-121493152-A translation (Year: 2026).*

* cited by examiner

Powered On → Enter Normal Operation Mode → Enter Standby Mode → Return to Normal Operation Mode

| Status | Locking Mode | Normal Operation Mode | Normal Operation Mode | Standby Mode | Standby Mode | Standby Mode | Standby Mode | Normal Operation Mode |
|---|---|---|---|---|---|---|---|---|
| Pedaling Input | First Feature Signal | None | Second Feature Signal | None | Third Feature Signal | Fourth Feature Signal | Second Feature Signal | None |
| Time-Duration | First Time-Duration | Second Time-Duration | Second Time-Duration | Second Time-Duration | Second Time-Duration | Second Time-Duration | Second Time-Duration | Second Time-Duration |

FIG.7

CONTROL SYSTEM AND CONTROL METHOD FOR E-BIKE

BACKGROUND OF THE DISCLOSURE

Technical Field

The disclosure relates to an e-bike, and particularly to a control system and a control method of controlling the e-bike based on sensing signals.

Description of Related Art

E-bike refers to a bicycle integrated with a motor, a driver, and different sensors to sense riding status of a rider and provides an auxiliary force by the motor, which allows the rider to pedal the bicycle with less effort.

The most common e-bike in the market is usually equipped with a torque sensor, a pedaling sensor, or an action sensor, etc. to measure rider's pedaling actions, and provide auxiliary forces in accordance with the pedaling actions through the motor. To unlock the motor of the bicycle, control peripheral devices (such as a headlight) of the bicycle, or adjust the auxiliary mode of the motor, the rider has to manually operate the dashboard along with the control handle on the bicycle.

However, the exsisted e-bike does not provide any redundant input source except for the dashboard and the control handle. When the dashboard and/or the control handle is malfunction, the rider can no longer control the e-bike. Moreover, equipping the dashboard and the control handle with the e-bike results in a higher cost, and wiring the dashboard and the control handle leads to a complicated assembly process of the e-bike. Also, the rider needs to move his/her hand to operate the dashboard and the control handle to control the e-bike while riding the e-bike, which brings the rider's safety issue.

SUMMARY OF THE DISCLOSURE

The present disclosure is directed to a control system and method for e-bike, which allows the user to operate the functions of the e-bike directly through pedaling actions and achieves a redundant input effect.

In one of the exemplary embodiments, the control system is integrated with an e-bike having a motor and a pedal, and includes:

- a sensor, configured to sense a sensing signal generated when the pedal is pedaled; and
- a driver connected to the sensor, and comprising:
- a counting unit configured to time a first time-duration under a locking mode in which the motor is locked and time a second time-duration under a normal operation mode and a standby mode in which the motor is unlocked;
- a command identifying unit configured to identify whether the sensing signal matches with an unlocking condition during the first time-duration and whether the sensing signal matches with a mode-determination condition during the second time-duration; and
- a control unit connected to the counting unit and the command identifying unit, configured to control the e-bike to enter the normal operation mode when the sensing signal matches with the unlocking condition, control the e-bike to enter the standby mode when the sensing signal matches with the mode-determination condition under the normal operation mode, or control the e-bike to return to the normal operation mode when the sensing signal again matches with the mode-determination condition under the standby mode.

In one of the exemplary embodiments, the control method is integrated with an e-bike having a motor and a pedal and includes following steps:

- a) sensing a sensing signal generated when the pedal is pedaled;
- b) accumulating a first time-duration under a locking mode in which the motor is locked;
- c) controlling the e-bike to enter a normal operation mode in which the motor is unlocked and starting to time a second time-duration when the sensing signal matches with an unlocking condition during the first time-duration;
- d) controlling the e-bike to enter a standby mode and accumulating the second time-duration under the standby mode when the sensing signal matches with a mode-determination condition during the second time-duration; and
- e) controlling the e-bike to return to the normal operation mode when the sensing signal again matches with the mode-determination condition under the standby mode.

The present disclosure regards the pedaling actions made by the user as an input source of control commands, so as to replace command input sources from a dashboard or control handle of a traditional bike. Therefore, the dashboard and the control handle can be removed, so the assembly process and the components of the bike can be simplified to reduce entire production cost. On the other hand, if the dashboard and the control handle are kept on the bike, the present disclosure may use the pedaling actions as a redundant input when the dashboard and/or the control handle is malfunction, so as to improve the user's safety while riding the bide.

DESCRIPTION OF THE DRAWINGS

FIG. 7 is a schematic diagram showing the control time-sequence according to an embodiment of the present disclosure.

DETAILED DESCRIPTION OF THE DISCLOSURE

In cooperation with the attached drawings, the technical contents and detailed description of the present disclosure are described hereinafter according to multiple embodiments. Any equivalent variation and modification made according to appended claims is all covered by the claims claimed by the present disclosure.

Figure 1:
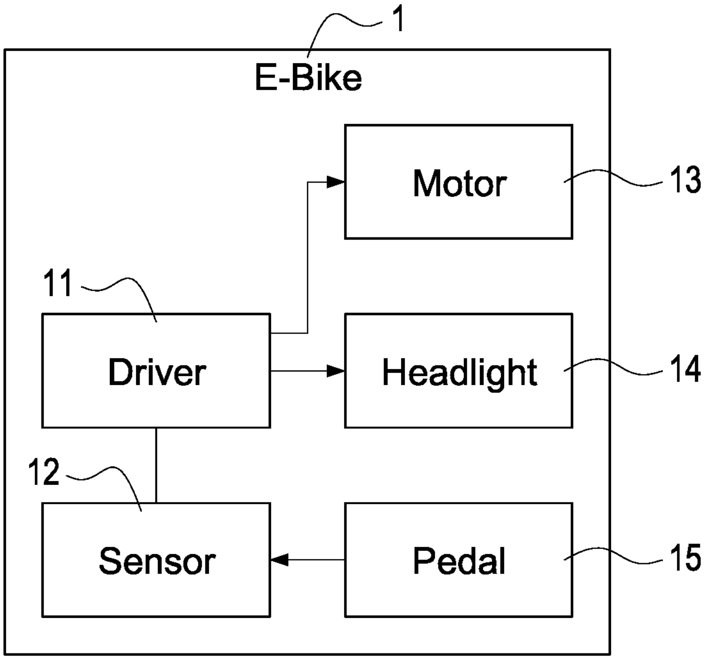
FIG. 1 is a block diagram of a control system according to an embodiment of the present disclosure.

Please refer to FIG. 1, which is a block diagram of a control system according to an embodiment of the present disclosure. As shown in FIG. 1, the control system of the present disclosure is integrated with an e-bike 1 and at least includes a driver 11 and a sensor 12, wherein the sensor 12 is connected to the driver 11.

In one embodiment, the control system of the present disclosure may be embedded in the e-bike 1 to be a core control system of the e-bike 1. In another embodiment, the control system may be individually existed and electrically connected or communication connected to the e-bike 1 through a wired manner or a wireless manner.

In the present disclosure, the sensor 12 may be any type of sensors which can measure or compute the pedaling actions of the user. For example, the sensor 12 may be a torque sensor, a pedal-angle sensor, a pedaling sensor, a pedal-frequency sensor, an action sensor, or a power meter, etc., but not limited thereto.

In one embodiment, the sensor 12 connects to a pedal 15 or other component that is related to user's pedaling action on the e-bike 1 through a wired manner or a wireless manner. The sensor 12 is used to sense the sensing signal generated due to the pedal action made by the user. In another embodiment, the sensor 12 is directly arranged on the pedel 15 or a related component to directly measure the sensing signal generated by the pedaling action of the user.

The driver 11 receives the sensing signal generated from the sensor 12. The driver 11 connects to a control core of the e-bike 1 (such as a motor 13) and at least one peripheral device (such as a headlight 14). In the present disclosure, the driver 11 determines whether the user intends to control the e-bike 1 based on the sensing signal from the sensor 12 and determines what is the control action required by the user. Therefore, the driver 1 controls the e-bike 1 to perform the control action corresponding to the user's control intention, such as switching to an auxiliary mode of the motor 13 that provides an auxiliary force (i.e., the auxiliary force provided by the motor 3 can be increased or decreased) or turning on or off the headlight 14 (including a front headlight and a rear headlight), etc.

However, the above descriptions are only a few embodiments of the present disclosure, the control made by the control system of the present disclosure to the e-bike 1 is not limited to the aforementioned motor 13 and headlight 14.

Figure 2:
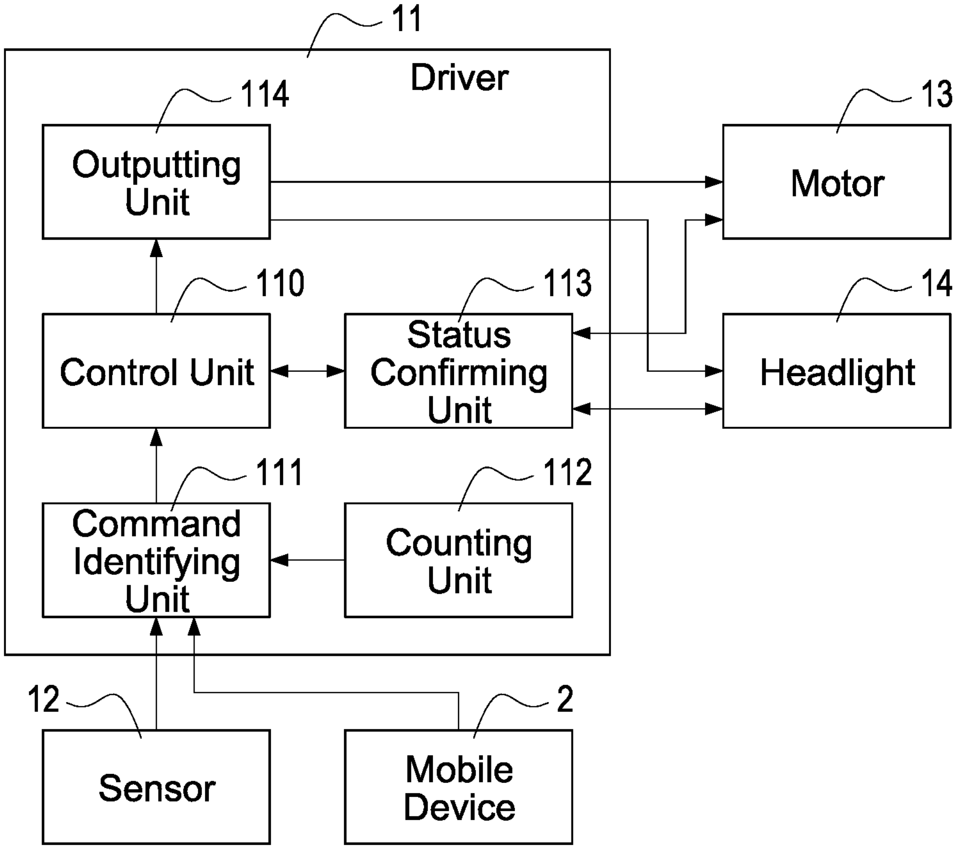
FIG. 2 is a block diagram of a driver according to an embodiment of the present disclosure.

Please refer to FIG. 2 at the same time, wherein FIG. 2 is a block diagram of a driver according to an embodiment of the present disclosure. The driver 11 of the present disclosure may be a central process unit (CPU), a micro control unit (MCU), a digital signal processor (DSP), a programmable logic controller (PLC), a system on chip (SoC), or a field programmable gate array (FPGA), etc. In the present disclosure, the driver 11 is embedded with corresponding software or firmware. The driver 11 executes the software or the firmware to internally create multiple software modules as shown in FIG. 2 based on the functions required by the control system.

In one embodiment, the multiple software modules of the driver 11 at least include a control unit 110, a command identifying unit 111, and a counting unit 112, wherein the counting unit 112 is connected to the command identifying unit 111 and the command identifying unit 111 is connected to the control unit 110.

As described above, the sensor 12 is used to generate the sensing signal of the e-bike 1 when the pedal 15 is pedaled by the user. The driver 11 is connected to the sensor 12 through a digital or analog signal receiving unit (not shown) to continuously receive the sensing signal generated from the sensor 12.

In the present disclosure, the e-bike 1 at least includes a power-off mode in which the motor is turned off, a locking mode in which the system is powered on but the motor 13 is locked, a normal operation mode in which the motor 13 is unlocked, and a standby mode in which the motor 13 is unlocked and waiting for any action commands. In particular, under the locking mode which the system is powered on but the motor 13 is still locked, the user may ride the e-bike 1 while the motor 13 is locked and restricted in providing the auxiliary force. Under the normal operation mode, the motor 13 may provide the auxiliary force correspondingly based on the current auxiliary mode and the pedaling action currently made by the user. Under the standby mode, the driver 11 receives the control command inputted based on the user's pedaling action and controls the e-bike 1 to perform the control action corresponding to the received control command.

Detailed contents about the aforementioned modes will be discussed later.

In the present disclosure, the driver 11 times a first time-duration (such as 5 seconds or 10 seconds, etc.) through the counting unit 112 when the system is powered on and the e-bike 1 is in the locking mode. The user has to perform a designated pedaling action by the pedal 15 in the first time-duration to unlock the motor 13 and make the e-bike 1 to enter the normal operation mode. It should be mentioned that the user can ride the e-bike 1 under either the locking mode or the normal operation mode, a difference is that the motor 13 of the e-bike 1 provides no auxiliary force under the locking mode but provides the auxiliary force under the normal operation mode.

In addition, the driver 11 times a second time-duration through the counting unit 112 when the e-bike 1 is in the normal operation mode or the standby mode. In should be mentioned that the second time-duration and the first time-duration may be same time length or different time lengths. A difference between the first time-duration and the second time-duration is that the counting unit 112 performs periodic timing in the normal operation mode or the standby mode based on the second time-duration.

The command identifying unit 111 continuously samples the sensing signal from the sensor 12 and checks these sampled sensing signals one by one to determine whether a feature signal that matches with a default condition is included in these sampled sensing signals. In the present disclosure, the command identifying unit 111 regards the feature signal that matches with the default condition as a control command that is inputted by the user through the user's pedaling action.

In one embodiment, the driver 11 uses the command identifying unit 11 to identify, during the first time-duration, whether the current-received sensing signal matches with a default unlocking condition. In particular, the command identifying unit 111 continuously samples and checks the sensing signal of the sensor 12 during the first time-duration when the e-bike 1 is powered on and determines whether these sampled sensing signals include the feature signal that matches with the unlocking condition (detailed discussion in the following), wherein the feature signal can be regarded as the control command.

In one embodiment, the driver 11 uses the command identifying unit 111 to identify, during the second time-duration, whether the sensing signal matches with a default mode-determination condition. In particular, the command identifying unit 111 continuously samples the sensing signal of the sensor 12 when the e-bike 1 is powered on, the motor 13 is unlocked, and the e-bike 1 is in the normal operation mode or the standby mode, and checks theses sampled sensing signals one by one in each cycle (i.e., the multiple continuous second time-durations) to determine whether these sampled sensing signals include the feature signal that matches with the mode-determination condition (detailed discussion in the following), wherein the feature signal can be regarded as the control command.

Specifically, the command identifying unit 111 checks a value, sign, frequency, or direction, etc. of these sampled sensing signals to determine whether the sampled sensing signals match with the unlocking condition and the mode-determination condition. In one embodiment, the sensing signal may be, for example but not limited to, a pedaling torque signal, a rotation angle signal of the pedal 15, a pedaling frequency signal, a pedaling direction signal of the pedal 15, a riding gradient signal, or a vehicle speed signal according to the type of the sensor 12.

When a sensing signal matches with the unlocking condition during the first time-duration, the command identifying unit 111 triggers the control unit 110 to control the e-bike 1 to enter the normal operation mode (in which the motor 13 is unlocked). Also, when a sensing signal matches with the mode-determination condition during the second time-duration under the normal operation mode, the command identifying unit 111 triggers the control unit 110 to control the e-bike 1 to enter the standby mode. Under the standby mode, the user may perform special pedaling actions to the e-bike 1 to operate the control core or the peripheral device (s) of the e-bike 1.

Moreover, when a sensing signal again matches with the mode-determination condition during the second time-duration under the standby mode, the command identifying unit 111 triggers the control unit 110 to control the e-bike 1 to return to the normal operation mode. Meanwhile, the control system determines that the user does not intend to operate the e-bike 1.

In one embodiment, the driver 11 may connect to user's mobile device 2 through a digital signal receiving unit or an analog signal receiving unit, wherein the mobile device 2 may be a smart phone, a smart watch, or a Bluetooth earphone, etc., but not limited thereto. The mobile device 2 may sense a pose or gesture of the user or environmental data around the user and then transmit the sensing signal to the driver 11. In the embodiment, the driver 11 may use the sensing signal provided by the mobile device 2 to fine-tune the auxiliary force provided by the motor 13 (for example, fine-tune the auxiliary force when the e-bike 1 goes downhill to assist the user). By combining the sensing signal of the sensor 12 and the sensing signal or pose/gesture of the mobile device 2 to perform identification, the probability of misjudgment can be further reduced.

Figure 3:
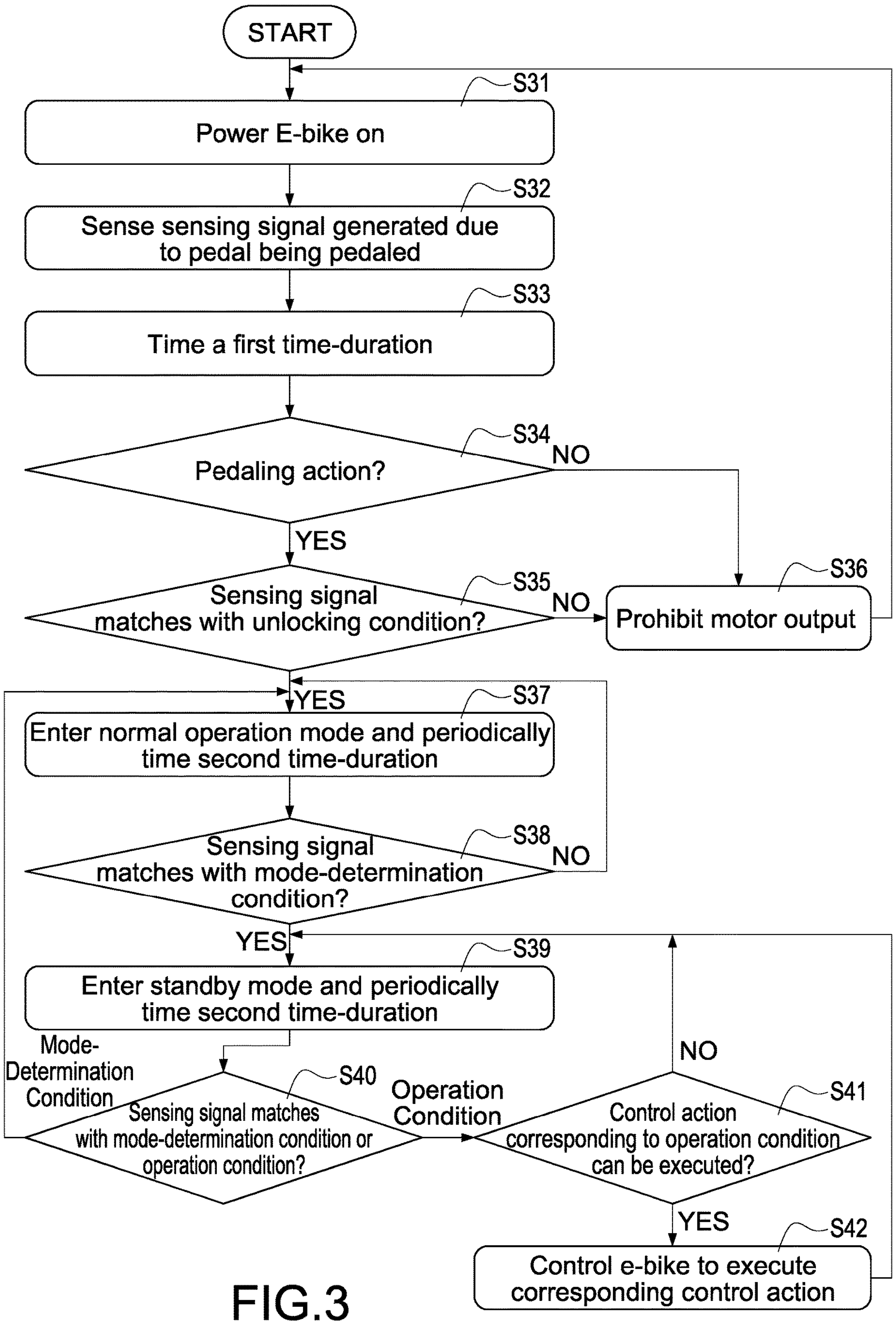
FIG. 3 is a flowchart of a control method according to an embodiment of the present disclosure.

Please refer to FIG. 3, which is a flowchart of a control method according to an embodiment of the present disclosure. FIG. 3 describes detailed steps of the control method of the present disclosure, and the control method is applied by the control system as shown in FIG. 1 and FIG. 2.

As shown in FIG. 3, when the e-bike 1 is powered off, the user cannot control the motor 13 of the e-bike 1 by the control system. Therefore, the user has to first power the e-bike 1 on (step S31). After being powered on, the e-bike 1 enters the locking mode in which the motor 13 is still locked and cannot provide any auxiliary force, so the e-bike 1 is only driven by the user.

After entering the locking mode, the control system continuously senses the sensing signal generated due to the pedal 15 being pedaled through the sensor 12 (step S32), and the driver 11 times a first time-duration through the counting unit 112 (step S33). In the embodiment, the driver 11 determines whether the user performs a pedaling action during the first time-duration (step S34), i.e., the driver 11 determines whether a normal sensing signal is received from the sensor 12. If the user does not perform any pedaling action during the first time-duration, the driver 11 controls the e-bike 1 to limit the output of the motor 13 for safety (step S36). Meanwhile, the driver 11 keeps the motor 13 of the e-bike 1 to be under the locking mode, and the control system goes back to the step S31 for re-execution and re-determination.

If the driver 11 determines that the user does perform the pedaling action during the first time-duration in step S34, the driver 11 further determines whether the sensing signal matches with the unlocking condition through the command identifying unit 111 (step S35). If the user does perform the pedaling action but the sensing signal does not match with the unlocking condition, which means that the user is riding the e-bike 1 but does not want to unlock the motor 13. In this scenario, the driver 11 controls the e-bike 1 to prohibit the output of the motor 13 (step S36), keeps the e-bike 1 to be under the locking mode, and the control system goes back to step S31 for re-execution and re-determination.

If the driver 11 determines that the user does perform the pedaling action during the first time-duration in the step S34 and determines that the sensing signal generated due to the pedaling action matches with the default unlocking condition in the step S35, the driver 11 controls the e-bike 1 to unlock the motor 13 and enter the normal operation mode through the control unit 110 and start to periodically time the second time-duration (step S37).

Under the normal operation mode, the driver 11 keeps receiving the sensing signal and periodically checks whether the received sensing signal matches with the default mode-determination condition during the second time-duration (step S38). If it is found that a sensing signal matches with the mode-determination condition, which means that the user wants to control the e-bike 1 through the pedaling action; otherwise, the user wants to normally ride the e-bike 1.

In particular, if the driver 11 determines that the sensing signal does not match with the mode-determination condition in one cycle, it keeps the e-bike 1 in the normal operation mode and then goes back to the step S37 to periodically check whether the next sensing signal matches with the default mode-determination condition during the second time-duration; otherwise, the driver 11 controls the e-bike 1 to enter the default standby mode and periodically time the second time-duration in the standby mode (step S39).

When the e-bike 1 is in the standby mode, the user may normally ride the e-bike 1. Meanwhile, the driver 11 records and samples every sensing signal generated due to the pedaling action made by the user, and the driver 11 continuously checks these sampled sensing signals one by one to determine whether these sampled sensing signals include the feature(s) matching with one or more default conditions during the second time-duration.

In one embodiment, when the driver 11 again determines that the sensing signal matches with the mode-determination condition in one cycle under the standby mode, it confirms that the user has finished operating the e-bike 1. Meanwhile, the driver 11 controls the e-bike 1 to return to the normal operation mode.

Specifically, when the e-bike 1 is in the standby mode, the driver 11 continuously checks whether the sampled sensing signal matches with either the mode-determination condition or an operation condition (step S40). When the sensing signal matches with the mode-determination condition, the driver 11 controls the e-bike 1 to return to the normal operation mode (i.e., returns to the step S37). When the sensing signal matches with the operation condition, the driver 11 controls the e-bike 1 to perform a control action corresponding to the operation condition.

In the present disclosure, the sensor 12 may be a pedaling sensor, and the sensing signal may include a rotation angle signal of the pedal 15.

In one embodiment, the control action includes turning the headlight 14 on or off or adjusting the auxiliary mode for the motor 13 to provide the auxiliary force. For example, when the sensing signal indicates that the user steps the pedal 15 forward for half a circle and an error of the rotation angle signal is less than a threshold, the driver 11 confirms that the sensing signal matches with the operation condition of turning on the headlight 14 and then controls the e-bike 1 to turn on the front headlight and the rear headlight; when the sensing signal indicates that the user steps the pedal 15 backward for half a circle and the error of the rotation angle signal is less than the threshold, the driver 11 confirms that the sensing signal matches with the operation condition of turning off the headlight 14 and then controls the e-bike 1 to turn off the front headlight and the rear headlight.

For another example, when the sensing signal indicates that the user steps the pedal 15 forward for one circle and the error of the rotation angle signal is less than a threshold, the driver 11 confirms that the sensing signal matches with the operation condition of increasing the motor auxiliary force and then controls the e-bike 1 to adjust the auxiliary mode that the motor 13 provides the auxiliary force to level up for one level; when the sensing signal indicates that the user steps the pedal 15 backward for one circle and the error of the rotation angle signal is less than the threshold, the driver 11 confirms that the sensing signal matches with the operation condition of decreasing the motor auxiliary force and then controls the e-bike 1 to adjust the auxiliary mode that the motor 13 provides the auxiliary force to level down for one level. The pedaling actions of stepping forward or stepping backward, and stepping half a circle or stepping one circle as mentioned above are not only intuitive but also having high variability among the actions, so the operation of the user can be simplified and the accuracy can be improved.

It should be mentioned that the control commands sent by the user through the pedaling actions should not conflict against the current status of the e-bike 1. For example, if the headlight 14 is on, even if the user sends the sensing signal that matches with the operation condition of turning on the headlight 14 through the pedaling action, the driver 11 will not again control the e-bike 1 to turn on the headlight 14. Similarly, if the headlight 14 is already turned off, even if the user sends the sensing signal that matches with the operation condition of turning off the headlight 14 through the pedaling action, the driver 11 will not again control the e-bike 1 to turn off the headlight 14.

For another example, the motor 13 may have multiple auxiliary modes with different levels to provide different auxiliary forces, wherein the auxiliary mode of a higher level may provide a higher auxiliary force while the auxiliary mode of a lower level may provide a lower auxiliary force. In the embodiment, if the motor 13 is under the highest level of auxiliary mode, even if the user sends the sensing signal that matches with the operation condition of increasing the level of the auxiliary mode through the pedaling action, the driver 11 will not adjust the motor 13 to level up the auxiliary mode. Similarly, if the motor 13 is already under the lowest level of auxiliary mode, even if the user sends the sensing signal that matches with the operation condition of decreasing the level of the auxiliary mode through the pedaling action, the driver 11 will not adjust the motor 13 to level down the auxiliary mode.

Figure 4A:
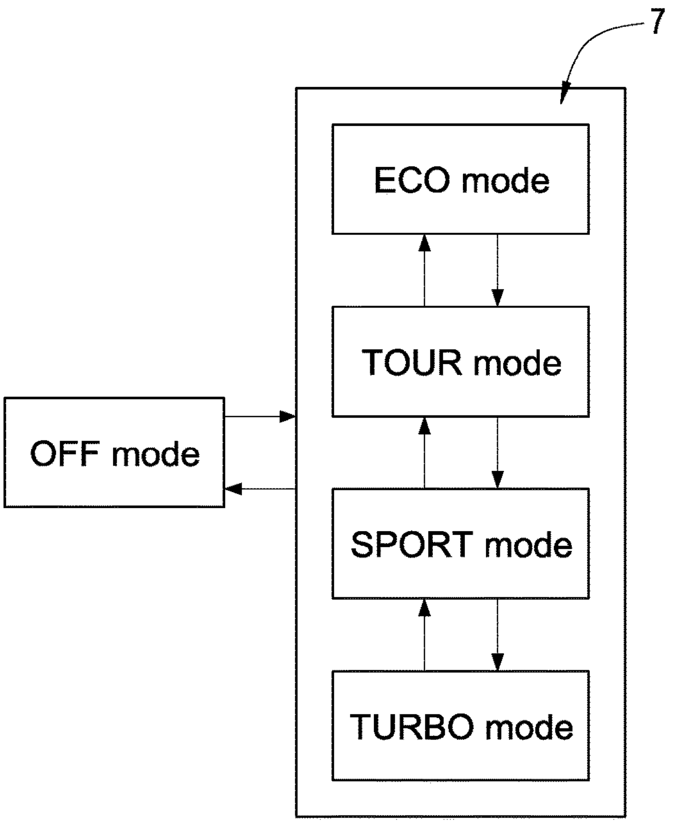
FIG. 4A is a schematic diagram of auxiliary modes according to an embodiment of the present disclosure.
Figure 4B:
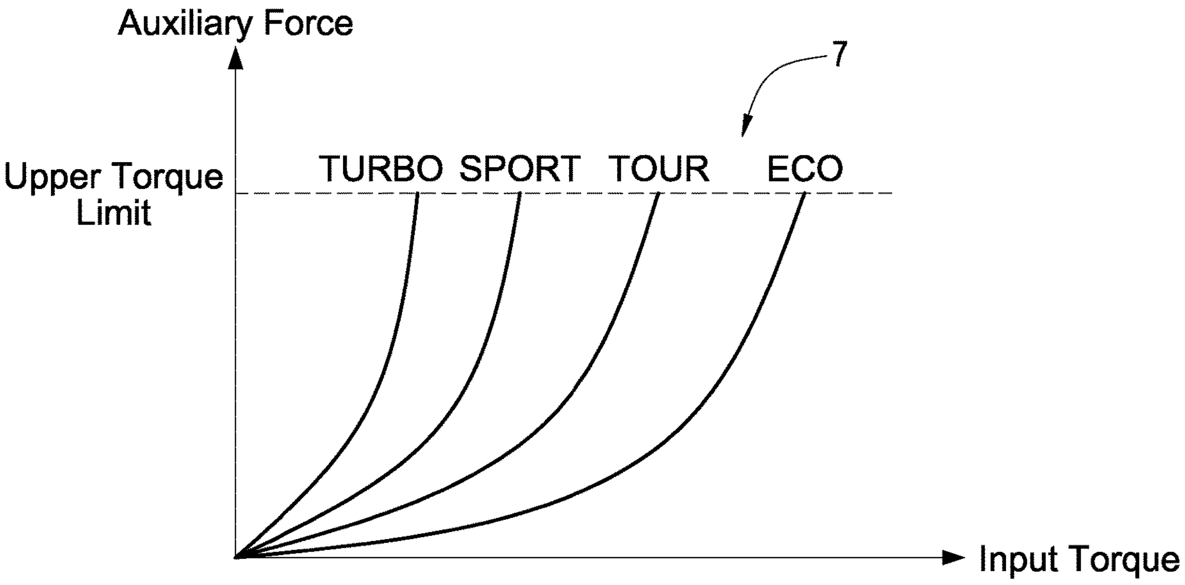
FIG. 4B is a schematic diagram showing the auxiliary forces according to an embodiment of the present disclosure.

Please refer to FIG. 4A and FIG. 4B at the same time, wherein FIG. 4A is a schematic diagram of auxiliary modes according to an embodiment of the present disclosure, and FIG. 4B is a schematic diagram showing the auxiliary forces according to an embodiment of the present disclosure. In the embodiment of FIG. 4A, the auxiliary mode 7 of the motor 13 includes an OFF mode, an ECO mode, a TOUR mode, a SPORT mode, and a TURBO mode, etc., wherein the motor 13 provides the smallest auxiliary force under the ECO mode and provides the largest auxiliary force under the TURBO mode. It should be mentioned that the motor 13 is unlocked under the OFF mode, but the motor 13 does not provide any auxiliary force under the OFF mode, which can be considered as a safety mechanism.

In the embodiment of FIG. 4A, the user may perform multiple pedaling actions that matches with the operation condition of increasing the level of the auxiliary mode in the standby mode until the driver 11 has adjusted the auxiliary mode 7 of the motor 13 to the TURBO mode. In addition, the user may perform multiple pedaling actions that matches with the operation condition of decreasing the level of the auxiliary mode until the driver 11 has adjusted the auxiliary mode 7 of the motor 13 to the OFF mode.

As shown in FIG. 4B, an upper torque limit of the auxiliary force provided by the motor 13 in each auxiliary mode 7 is the same. However, in a higher level of auxiliary mode 7 (such as the TURBO mode), the user may easily trigger the motor 13 to provide a larger auxiliary force by slightly stepping on the pedal 15 (i.e., the user input torque can be small); on the contrary, in a lower level of auxiliary mode 7 (such as the ECO mode), the user can only trigger the motor 13 to provide a larger auxiliary force by heavily stepping on the pedal 15 (i.e., the user input torque should be large).

According to the above scenarios, before controlling the e-bike 1 to perform the corresponding control action under the standby mode, the driver 11 has to first check the current status of the e-bike 1 for safety.

Please refer back to FIG. 2 and FIG. 3. As shown in FIG. 2, the driver 11 further includes a status confirming unit 113 and an outputting unit 114 that are connected to the control unit 110.

The status confirming unit 113 connects to the motor 13, the headlight 14, and another peripheral device (not shown) of the e-bike 1 through a digital signal receiving unit or an analog signal receiving unit. The outputting unit 114 connects to the motor 13, the headlight 14, and other peripheral device of the e-bike 1 through electronic lines.

When the command identifying unit 111 determines that the sensing signal matches with any of the default operation conditions under the standby mode, the driver 11 confirms the current status of the motor 13, the headlight 14, or other peripheral device through the status confirming unit 113. In the embodiment of FIG. 3, when the command identifying unit 111 determines that the sensing signal matches with one of the operation conditions, the driver 11 confirms the current status of the e-bike 1 (such as the status of the headlight 14 or the auxiliary mode 7 of the motor 13) through the status confirming unit 113, so as to determine whether the control action corresponding to this operation condition can be executed (step S41).

When the current status of the e-bike 1 conflicts against the control action corresponding to the matched operation condition, the driver 11 will not control the e-bike 1, instead, the e-bike 1 stays in the standby mode (i.e., goes back to the step S39). When the current status of the e-bike 1 does not conflict against the control action corresponding to the matched operation condition in the step S41, the driver 11 provides corresponding power to the e-bike 1 through the outputting unit 114 to control the motor 13, the headlight 14, or other peripheral device of the e-bike 1 to execute the control action corresponding to the operation condition (step S42).

In the present disclosure, the control system may continuously execute each step shown in FIG. 3 to continuously identify the user's control intention. Also, the control system stops executing the control method of the present disclosure after being powered off.

As mentioned above, the control system and control method of the present disclosure uses the sensor 12 to sense the user's pedaling actions, so as to control the e-bike 1 to switch between different modes. Therefore, the sensing signals generated by the sensor 12 are critical to the present disclosure.

In one embodiment, the sensor 12 includes a pedaling sensor, the sensing signals generated by the pedaling sensor at least include a pedaling torque signal and a rotation angle signal of the pedal 15. The pedaling torque signal indicates the pedaling force the user made to the pedal 15 (i.e., the pedaling torque), and the rotation angle signal indicates the rotation angle of the pedal 15 after being pedaled by the user. By analyzing the pedaling force and the rotation angle, the driver 11 may determine whether the user intends to control the e-bike 1 or not.

Figure 5A:
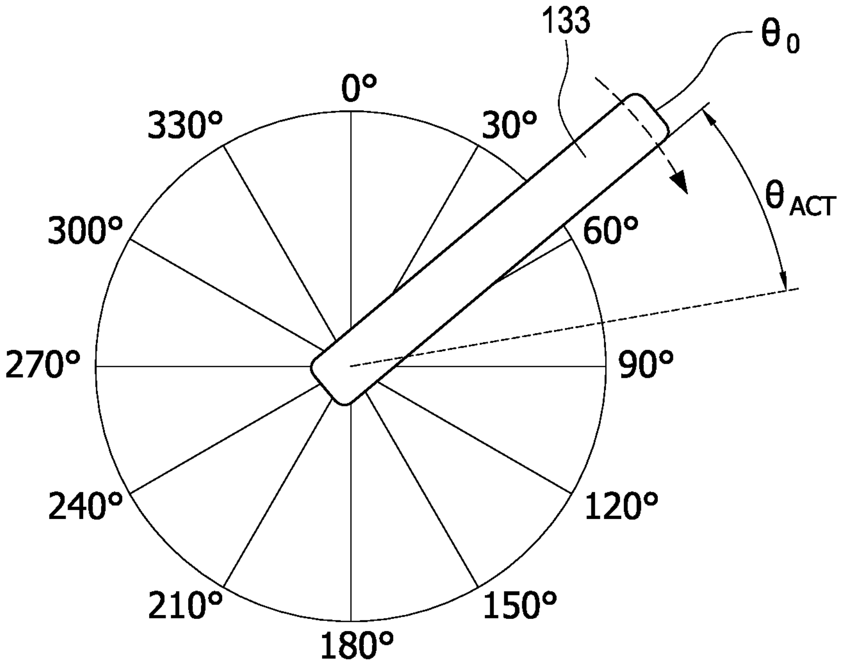
FIG. 5A is a schematic diagram showing the pedaling action according to an embodiment of the present disclosure.
Figure 5B:
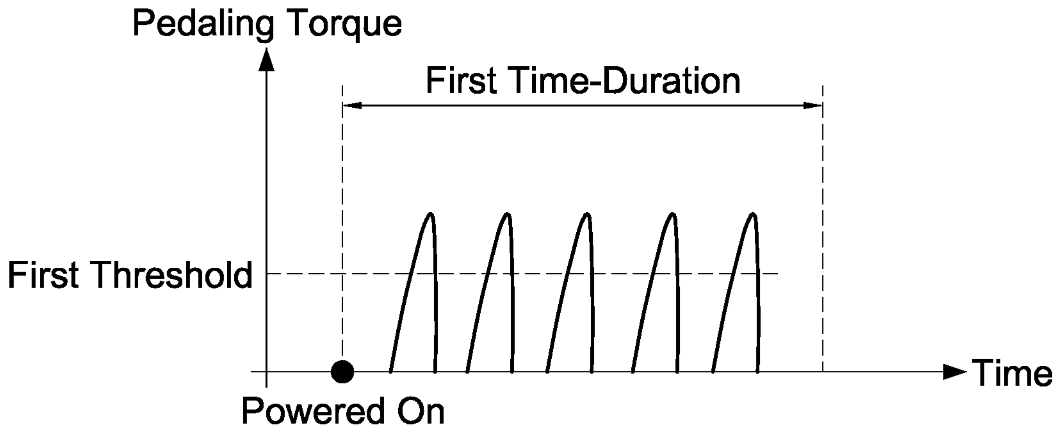
FIG. 5B is a schematic diagram showing the unlocking condition according to an embodiment of the present disclosure.

Please refer to FIG. 5A and FIG. 5B at the same time, wherein FIG. 5A is a schematic diagram showing the pedaling action according to an embodiment of the present disclosure, and FIG. 5B is a schematic diagram showing the unlocking condition according to an embodiment of the present disclosure. As shown in FIG. 5A, the pedal 15 of the e-bike 1 is preset with an initial angle $\theta_0$. When the user steps on the pedal 15, the pedal 15 is forced to rotate, and the sensor 12 may sense a pedaling torque signal and a rotation angle signal of the pedal 15.

As mentioned above, if the user wants the e-bike 1 to enter the normal operation mode, the user needs to step on the pedal 15 during the first time-duration under the locking mode and ensures the sensing signal generated by the pedaling action to match with the mode-determination condition. In one embodiment, multiple pedaling actions are indicated from the sensing signal according to the mode-determination condition during the first time-duration, wherein the pedaling torque signal of each pedaling action is greater than a first threshold while the rotation angle signal of each pedaling action is smaller than a second threshold.

As shown in FIG. 5A and FIG. 5B, when the user steps on the pedal 15 for many times (such as 5 times) during the first time-duration, the sensor 12 may sense multiple pedaling torque signals. In one embodiment, the driver 11 may determine whether the multiple pedaling torque signals are greater than the first threshold to avoid accidental trigger.

In one embodiment, the user needs to pull the handbrake while pedaling, so the multiple rotation angle signals of the pedal 15 can be limited smaller than an action-restricted angle $\theta_{ACT}$ (i.e., the second threshold). Under the circumstance, during the first time-duration, multiple pedaling torque signals match with the first threshold and multiple rotation angle signals match with the second threshold, so the driver 11 may determine that the user does intend to unlock the e-bike 1 and then control the e-bike 1 to switch from the current locking mode to the normal operation mode.

As mentioned above, when the e-bike 1 is in the normal operation mode, the user may normally ride the e-bike 1 through regular pedaling and switch the e-bike's mode and input commands through special pedaling actions. To avoid accidental trigger, the present disclosure sets a special pedaling feature as the mode-determination condition.

In one embodiment, the driver 11 confirms that the user intends to input a command when the user first steps the pedal 15 backward and then steps the pedal 15 forward during the second time-duration under the normal operation mode and the pedaling angles of each pedaling match with a default threshold. Therefore, the driver 11 controls the e-bike 1 to enter the standby mode. However, the above description is only one of the exemplary embodiments of the present disclosure, but not limited thereto.

Figure 6A:
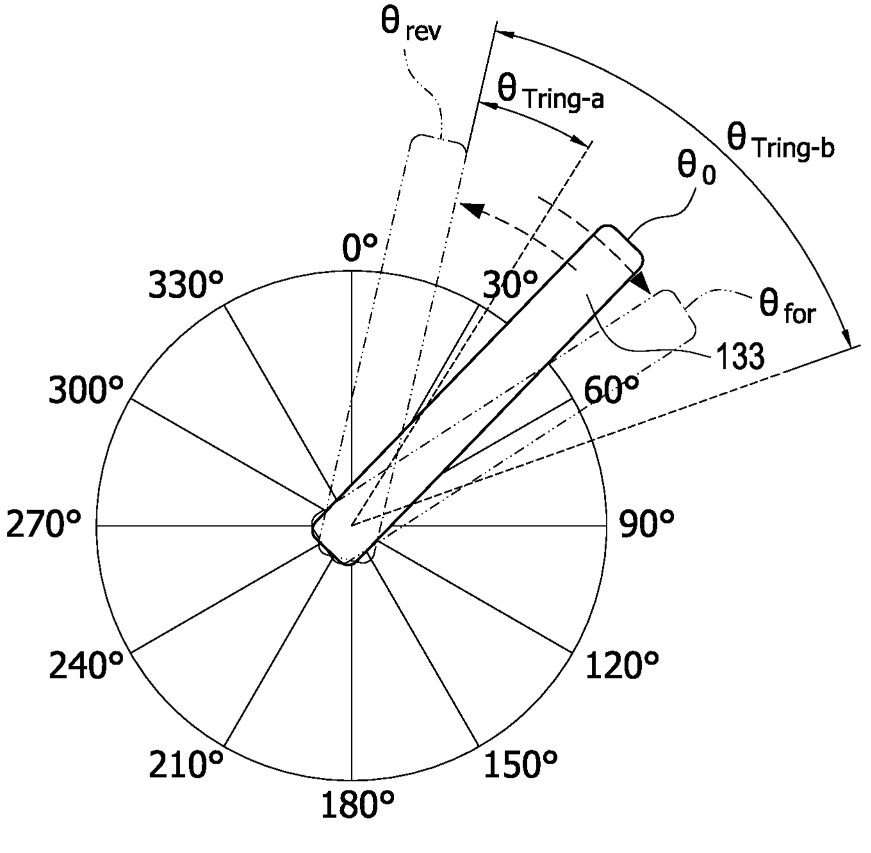
FIG. 6A is a schematic diagram showing the pedaling action according to an embodiment of the present disclosure.
Figure 6B:
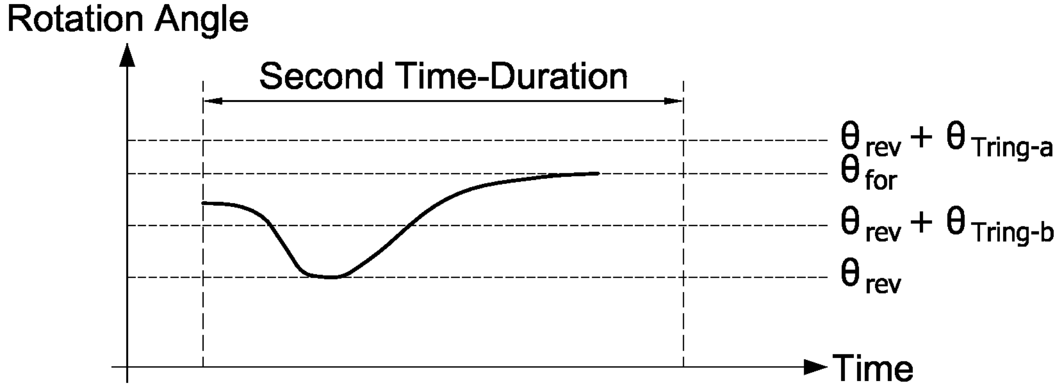
FIG. 6B is a schematic diagram showing the mode-determination condition according to an embodiment of the present disclosure.

Please refer to FIG. 6A and FIG. 6B at the same time, wherein FIG. 6A is a schematic diagram showing the pedaling action according to an embodiment of the present disclosure, and FIG. 6B is a schematic diagram showing the mode-determination condition according to an embodiment of the present disclosure.

As shown in FIG. 6A and FIG. 6B, the driver 11 may set a first triggering angle $\theta_{Tring\text{-}a}$ that is smaller than the initial angle $\theta_0$ of the pedal 15 and a second triggering angle $\theta_{Tring\text{-}b}$ that is greater than the initial angle $\theta_0$ of the pedal 15, and then set a condition range based on the first triggering angle $\theta_{Tring\text{-}a}$ and the second triggering angle $\theta_{Tring\text{-}b}$. When the user first steps the pedal 15 backward and then steps the pedal 15 forward during the second time-duration under the normal operation mode, the driver 11 may confirm that the pedaling action matches with the mode-determination condition if a pedaling-backward angle $\theta_{rev}$ generated by the backward pedaling action is smaller than the first triggering angle 74 $_{Tring\text{-}a}$ and a pedaling-forward angle $\theta_{for}$ generated by the forward pedaling action is greater than the first triggering angle $\theta_{Tring\text{-}a}$ and smaller than the second triggering angle $\theta_{Tring\text{-}b}$.

By setting a relatively strict mode-determination condition, the present disclosure prevents the driver 11 from misjudging user's intention of riding the e-bike and causing dangerous.

It should be noticed that the present disclosure determines user's intention by checking the rotation angle of the pedal 15, instead of asking the user to step the pedal 15 to a specific position. More specifically, the rotation angle signal of the pedal 15 is a pulse signal, instead of an absolute position of the pedal 15 on the e-bike 1. Therefore, the driver 11 can be prevented from misjudging the user's intention feature to be other operation feature.

In one embodiment, the driver 11 determines that the user's pedaling action matches with the operation condition of turning on the headlight 14 when the pedaling action includes stepping the pedal 15 forward for half a circle (e.g., +180 degrees starting from the initial angle $\theta_0$) during the second time-duration under the standby mode, and determines that the user's pedaling action matches with the operation condition of turning off the headlight 14 when the pedaling action includes stepping the pedal 15 backward for half a circle (e.g., −180 degrees starting from the initial angle $\theta_0$) during the second time-duration under the standby mode.

In one embodiment, the driver 11 determines that the user's pedaling action matches with the operation condition of leveling up the auxiliary mode when the pedaling action includes stepping the pedal 15 forward for one circle (e.g., +360 degrees starting from the initial angle $\theta_0$) during the second time-duration under the standby mode, and determines that the user's pedaling action matches with the operation condition of leveling down the auxiliary mode when the pedaling action includes stepping the pedal 15 backward for one circle (e.g., −360 degrees starting from the initial angle $\theta_0$) during the second time-duration under the standby mode.

When checking one sensing signal, the driver 1 may determine whether this sensing signal includes multiple features corresponding to multiple control commands. If one sensing signal simultaneously includes multiple features corresponding to multiple control commands, the driver 11 only performs the last control command. For example, the sensing signal corresponding to stepping the pedal 15 for one circle includes the sensing signal corresponding to stepping the pedal 15 for half a circle; since stepping the pedal 15 for one circle is the last feature to be achieved, the driver 11 only checks the feature of stepping for one circle and performs the control command corresponding to this feature.

However, the above descriptions about the operation conditions under the standby mode are only a part of the exemplary embodiments of the present disclosure, but not limited thereto.

Please refer to FIG. 7, which is a schematic diagram showing the control time-sequence according to an embodiment of the present disclosure. FIG. 7 describes how the user controls the e-bike 1 through the pedaling actions.

As shown in FIG. 7, when the bike system (including the control system and the e-bike 1) is powered on, the e-bike 1 enters the locking mode. Meanwhile, the driver 11 starts to time the first time-duration, and the sensor 12 senses the user's pedaling input during the first time-duration. When a feature signal that matches with the unlocking condition (such as a first feature signal) is found from the user's pedaling input, the driver 11 controls the e-bike 1 to enter the normal operation mode.

In the normal operation mode, the driver 11 periodically times the second time-duration and checks the user's pedaling input during the second time-duration. When a feature signal that matches with the mode-determination condition (such as a second feature signal) is found from the user's pedaling input, the driver 11 controls the e-bike 1 to switch from the normal operation mode to the standby mode.

In the standby mode, the driver 11 periodically times the second time-duration and checks the user's pedaling input during the second time-duration. When a feature signal that matches with a first operation condition (such as a third feature signal for turning on or off the headlight 14) is found from the user's pedaling input, the driver 11 controls the e-bike 1 to turn on or off the headlight 14 of the e-bike 1. Also, when a feature signal that matches with a second operation condition (such as a fourth feature signal for leveling up or down the auxiliary mode of the motor 13 to provide the auxiliary force) is found from the user's pedaling input, the driver 11 controls the e-bike 1 to level up or down the auxiliary mode of the motor 13 to next level.

After the third feature signal and/or the fourth feature signal is found, the system is still under the standby mode, and the driver 11 periodically times the second time-duration and checks the user's pedaling input during the second time-duration. When the second feature signal that matches with the mode-determination condition is found again from the pedaling input, it means the user has finished its control to the e-bike 1. Meanwhile, the driver 11 controls the e-bike 1 to switch from the standby mode to the normal operation mode. Under the normal operation mode, the driver 11 only checks whether the user's pedaling input matches with the mode-determination condition or not, and the driver 11 does not check whether the pedaling input matches with any of the operation conditions. Therefore, the misjudgment can be effectively avoided.

It should be mentioned that the control system and the control method of the present disclosure use the user's pedaling actions to directly control the e-bike 1; however, the e-bike 1 can still retain the full dashboard (and the corresponding control handle). Therefore, the dashboard and the control system of the present disclosure can be regarded as redundant control solutions. When one of the dashboards and the control system of the e-bike 1 is malfunction, the user can still control the e-bike 1 through the redundant control solution. As a result, the safety of the e-bike is improved.

Moreover, because the user is allowed to directly control the e-bike 1 through his/her pedaling actions, the manufacturer of the dashboard may simplify the design of the dashboard to retain only the displaying function for information such as vehicle speed, remaining power, and faulty alarm, etc. without the operation function as discussed above. Therefore, simple displaying module, such as a light-emitting diode (LED) module or a liquid-crystal display (LCD) module is enough to implement the dashboard, so as to simplify the assembly process of the e-bike 1 and reduce the cost of the e-bike 1 while retaining the dashboard on the e-bike 1.

As the skilled person will appreciate, various changes and modifications can be made to the described embodiment. It is intended to include all such variations, modifications and equivalents which fall within the scope of the present disclosure, as defined in the accompanying claims.

What is claimed is:

1. A control system for an e-bike, integrated with the e-bike having a motor and a pedal, comprising:

- a sensor configured to sense a sensing signal generated when the pedal is pedaled, wherein the sensor comprises a pedaling sensor, and the sensing signal comprises a pedaling torque signal and a rotation angle signal of the pedal; and
- a driver connected to the sensor, comprising:
  - a counting unit configured to time a first time-duration under a locking mode in which the motor is locked and time a second time-duration under a normal operation mode and a standby mode in which the motor is unlocked;
  - a command identifying unit configured to identify whether the pedaling torque signal and the rotation angle signal of the sensing signal matches with an unlocking condition during the first time-duration and whether the pedaling torque signal and the rotation angle signal of the sensing signal matches with a mode-determination condition during the second time-duration; and
  - a control unit connected to the counting unit and the command identifying unit, configured to control the e-bike to enter the normal operation mode when the sensing signal matches with the unlocking condition, control the e-bike to enter the standby mode when the sensing signal matches with the mode-determination condition under the normal operation mode, or control the e-bike to return to the normal operation mode when the sensing signal again matches with the mode-determination condition under the standby mode.

2. The control system 1, wherein the command identifying unit is configured to indicate multiple pedaling actions in the sensing signal, and determine that the sensing signal matches with the unlocking condition when the pedaling torque signal of each pedaling action is greater than a first threshold and the rotation angle signal of each pedaling action is smaller than a second threshold.

3. The control system in claim 1, wherein the control unit is configured to control the e-bike to execute a control action corresponding to the operation condition when the sensing signal matches with an operation condition under the standby mode, wherein the control action corresponding to the operation condition comprises turning on or off a headlight of the e-bike or adjusting an auxiliary mode of the motor to provide an auxiliary force.

4. The control system in claim 1, wherein the driver further comprises:

a status confirming unit connected to the control unit, the motor, and a headlight of the e-bike, configured to confirm a current status of the motor or the headlight when the sensing signal matches with an operation condition under the standby mode; and an outputting unit connected to the control unit, the motor, and the headlight;

wherein the control unit is configured to control the motor or the headlight to execute the control action through the outputting unit when the current status does not conflict with a control action corresponding to the operation condition, wherein the control action corresponding to the operation condition comprises turning on or off the headlight or adjusting an auxiliary mode of the motor to provide an auxiliary force.

5. A control method for an e-bike, integrated with the e-bike having a motor and a pedal, comprising:

a) sensing a sensing signal generated by a pedaling sensor when the pedal is pedaled, wherein the sensing signal comprises a pedaling torque signal and a rotation angle signal of the pedal;

b) accumulating a first time-duration under a locking mode in which the motor is locked;

c) controlling the e-bike to enter a normal operation mode in which the motor is unlocked and starting to time a second time-duration when the pedaling torque signal and the rotation angle signal of the sensing signal matches with an unlocking condition during the first time-duration;

d) controlling the e-bike to enter a standby mode and accumulating the second time-duration under the standby mode when the pedaling torque signal and the rotation angle signal of the sensing signal matches with a mode-determination condition during the second time-duration; and e) controlling the e-bike to return to the normal operation mode when the pedaling torque signal and the rotation angle signal of the sensing signal again matches with the mode-determination condition under the standby mode.

6. The control method in claim 5, wherein the step c) comprises: indicating multiple pedaling actions in the sensing signal during the first time-duration; and determining that the sensing signal matches with the unlocking condition when the pedaling torque signal of each pedaling action is greater than a first threshold and the rotation angle signal of each pedaling action is smaller than a second threshold.

7. The control method in claim 5, further comprising:

f) controlling the e-bike to execute a control action corresponding to the operation condition when the sensing signal matches with an operation condition under the standby mode;

wherein the control action corresponding to the operation condition comprises turning on or off a headlight of the e-bike or adjusting an auxiliary mode of the motor to provide an auxiliary force.

8. The control method in claim 7, wherein the step f) comprises:

f1) confirming a current status of the motor or the headlight of the e-bike when the sensing signal matches with the operation condition under the standby mode; and f2) controlling the motor or the headlight to execute the control action correspondingly when the current status does not conflict with the control action corresponding to the operation condition.

* * * * *